April 7, 1959     A. HEINZ     2,881,392
D. C. VOLTAGE RATIO MEASURING SYSTEM
Filed Jan. 10, 1955
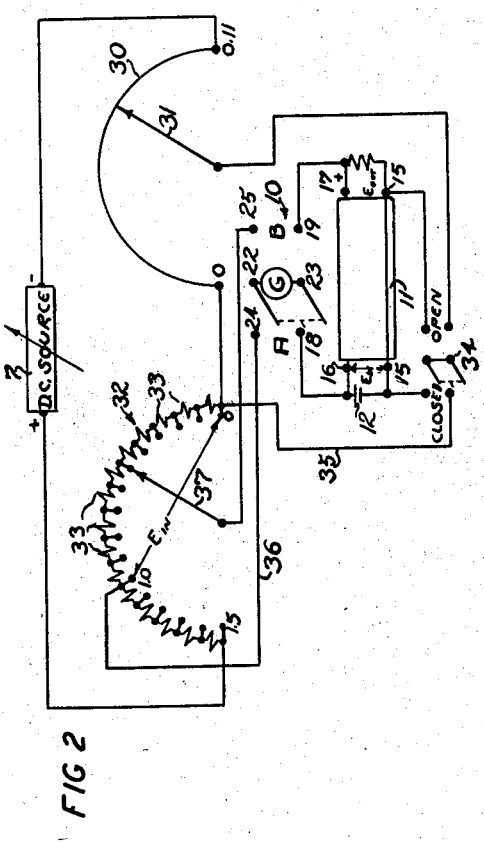
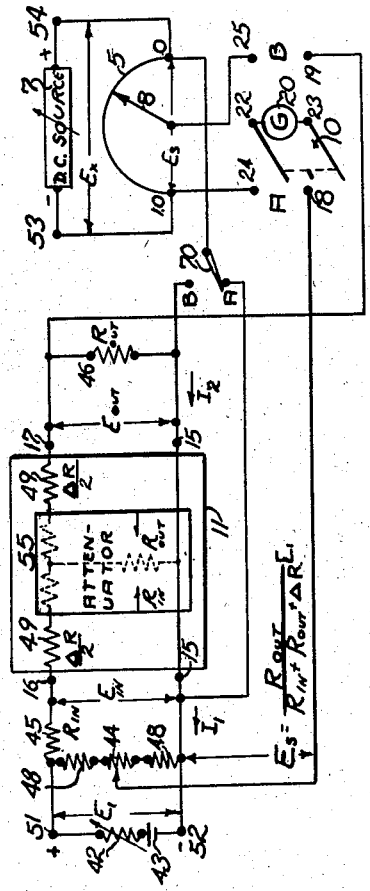
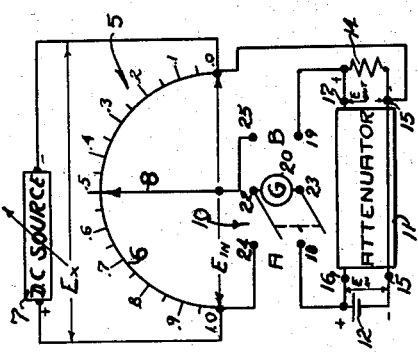
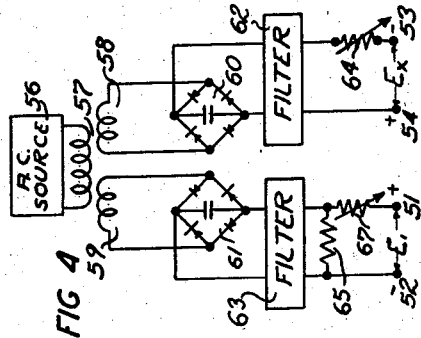
INVENTOR
*ALFRED HEINZ*
By
ATTORNEY United States Patent Office 2,881,392
Patented Apr. 7, 1959

2,881,392

D.C. VOLTAGE RATIO MEASURING SYSTEM

Alfred Heinz, Union, N.J., assignor to Western Electric Company, Incorporated, New York, N.Y., a corporation of New York Application January 10, 1955, Serial No. 480,839

8 Claims. (Cl. 324—98)

This invention relates to electrical measurements and particularly to methods of and apparatus for making insertion loss measurements as encountered in calibrating attenuators.

Attenuators as used in insertion or transmission loss test sets, are generally of the adjustable decade type to provide simple and efficient means for controlling transmission through one arm of a comparison type measuring circuit i.e., a circuit in which the normal insertion loss measuring procedure requires two tests or measurements of absolute transmission level through the measuring circuit, one with the test sample in the path of transmission and the other with the attenuator, the attenuator being adjusted to effect an equality of transmission level to that of the first test. Since in such insertion loss circuits the attenuator serves as a transmission standard to which the loss of the test sample is compared, it is of the utmost importance that its loss be accurately known. To this end, attenuators are generally calibrated on a D.C. basis in a manner which relates the input and output voltages, "$E_{in}$" and "$E_{out}$" respectively, in accordance with the loss formula, where loss in decibels, $$db = 20 \log \frac{E_{in}}{E_{out}} \qquad (1)$$

One conventional method of calibrating attenuators in accordance with Formula 1 involves making separate measurements of $E_{in}$ and $E_{out}$ to a high accuracy with a potentiometer type voltmeter which must be standardized or zeroed with a standard voltage cell. This calibration of the potentiometer involves adjusting the output voltage of the potentiometer potential source $E_x$ which is applied across the precision resistance elements of the measuring potentiometer to balance out the potential of the standard voltage cell which is applied across a specific portion of the potentiometer. The attenuator input and output voltages are measured with the standardized potentiometer and the attenuator loss in decibels is computed from Formula 1.

The principal difficulty encountered with this arrangement is that the potentiometer voltage source $E_x$ and the attenuator supply source $E_s$ are subject to drift while the measurements are being made. This drift in $E_x$ requires repeated standardization of the potentiometer with the standard cell and the drift in $E_s$ requires making fast as well as repeated input and output voltage measurements on the attenuator. Even with these repeated measurements the results are still not exact since the readings cannot be made simultaneously.

This measuring system is also inherently inaccurate for practical circuits where small but nevertheless significant mismatches between the measuring circuit components give rise to small measurement errors. These losses are important in present day communications equipment and systems in which measurements in the accuracy range of 1/100 of a decibel must be made. To achieve this accuracy for higher loss levels it may be necessary to measure the output voltage to an accuracy of 1 to 10 microvolts.

A good portion of errors due to the resistance of the internal cabling and contact resistance may be eliminated by making a "Zero Loss" measurement for each attenuator which is subtracted from the measured insertion loss for each of the attenuator settings. In making this "Zero Loss" measurement the attenuator is set to its zero decibel position and $E_{in}$ and $E_{out}$ measured as before, the "Zero Loss" in decibels being computed from Equation 1. The true loss may then be obtained by subtracting the "Zero Loss" from the measured loss. This "Zero Loss" correction, however, must be made for each attenuator setting.

An additional factor of uncertainty affecting attenuator calibration accuracy is that of temperature coefficients of attenuator elements. The latest coaxial attenuators are designed for nominally equal temperature coefficients of the shunt and series elements thereof. However, the shunt and series elements are of different physical structures and therefore not subject to the same manufacturing operations nor are the elements comprising any one attenuator unit necessarily made from the same lot of material or baked or fixed at the same time. Consequently, small variations in temperature coefficients will be experienced. Theoretically then, a calibration is accurate only for the temperature under which the calibration was made; that is, for the ambient temperature and testing-current conditions. These are subject to considerable variations and it is thus not possible to obtain a calibration which is equally accurate for all temperature and loss-level conditions. To minimize these temperature effects calibration should be made at the prevailing average ambient temperature and with a calibration current which approximates the average testing current prevailing in the loss circuit of which the attenuator is a component.

In the aforementioned attenuator calibration using a potentiometer voltmeter, because the potentiometer must be standardized with a standard cell (with a voltage of 1.0176 to 1.0202) the best accuracy of the instrument is limited to a voltage range determined by the standard cell. Using a commercially available potentiometer voltmeter such as the Leeds & Northrup Company's type K potentiometer, it is possible to obtain the required accuracy (that is voltage readings to five or six digits) but unfortunately only at the cost of reduced calibration accuracy due to calibration currents substantially in excess of the normal attenuator input.

The principal object of this invention is to improve the accuracy in calibrating attenuators and also to substantially reduce the time required for such calibration.

Another object of this invention is a method of standardizing a potentiometer for making direct measurements of voltage ratios.

In accordance with the general features of the invention, a potentiometer having a calibrated series impedance network shunted by a variable potential source is standardized for making a D.C. voltage ratio measurement directly rather than by computing the quotient of two measured absolute voltages by making the potential difference developed over a calibrated unit equal to one of the potential differences so that the number of units required to develop the second potential is equal to the ratio of said second potential difference to the first.

More specifically, as applied to the direct measuring of the output to input voltage ratio of an attenuator, the attenuator input voltage is applied across a unity sub-division of a potentiometer and the potentiometer is calibrated thereto by adjusting the potentiometer potential source, which is applied across the full potentiometer, to produce a potential difference across said sub-division equal to the input voltage. The attenuator input voltage is then removed from the potentiometer and the attenuator output voltage is balanced on the potentiometer; the number of potentiometer sub-divisions required to develop the balancing potential is a direct measure of the ratio of the attenuator output voltage to its input voltage. With this procedure the voltage $E_{in}$ of Equation 1 may be the normal input voltage for the attenuator.

In calibrating decade type attenuators the potentiometer is, for convenience, standardized with the attenuator input voltage since this will remain constant for all settings of the attenuator and in addition the output voltage, especially at high attenuator settings, may be extremely small.

The attenuator voltage ratio measuring procedure may be modified to give a direct, "Zero Loss" corrected voltage ratio measurement for determining the insertion loss of the attenuator by applying the normal operating potential to the input to the attenuator, setting the attenuator to its "no loss" position and applying the attenuator output voltage across a unity sub-division of the potentiometer and adjusting the potentiometer potential source to standardize the potentiometer by making the potential difference across the unity sub-division equal to the output voltage. The attenuator is then set to one of its loss positions and its output voltage thereof balanced on the potentiometer, the number of potentiometer sub-divisions required to develop the balancing potential is a direct measure of the ratio of the attenuator output voltage to its input voltage, corrected for "Zero Loss."

To facilitate making loss measurements, a chart may be prepared listing different values of $$\frac{E_{out}}{E_{in}}$$

and corresponding $$20 \log \frac{E_{in}}{E_{out}}$$

values so that the loss in decibles may be obtained therefrom without requiring calculations for any potentiometer reading.

According to a feature of the invention, the potentials for both the attenuator and the potentiometer may be derived from the same power supply so that the effect of variations or drift in the source will be negligible since the potentiometer source is standardized with the attenuator source.

These and other features of the invention will be more fully understood from the following detailed description taken in conjunction with the accompanying drawing, in which:

Fig. 1 is a simplified schematic diagram of a potentiometer circuit for making voltage ratio measurements according to the invention;

Fig. 2 is a schematic circuit diagram of a system similar to that of Fig. 1 having a greater ratio range and including fine and coarse adjustments for obtaining ratio readings of greater accuracy;

Fig. 3 is an attenuator calibrating circuit having a modified input circuit for compensating for Zero Losses and reflection losses, and Fig. 4 is a schematic circuit diagram of a power supply for an attenuator calibration system.

Referring now to the drawing, in Fig. 1 a potentiometer 5 comprising a resistance slide wire 6 is calibrated in equal divisions of resistance from 0 to 1.0 and is connected across a variable D.C. potential source 7 the output of which is $E_x$ volts. The positive side of the source 7 is connected to the 1.0 side of the potentiometer and the negative side connected to the 0 side. An attenuator 11, or other network whose input to output voltage ratio is to be measured, is energized from potential source 12 on its input side and is terminated with an impedance 14 on its output side. The common terminal 15 of the attenuator 11 is connected to the zero end of the potentiometer 5, the input and output terminals 16 and 17 respectively, being connected to terminals 18 and 19 of a double pole, double throw switch 10 having a galvanometer indicator 20 connected across its middle contacts 22 and 23. The other terminals 24 and 25 of switch 10 are connected to the 1.0 side of the potentiometer 5 and the movable contact arm 8 thereof respectively.

To make a measurement of the ratio of the attenuator output voltage $E_{out}$, which appears across the terminals 17 and 15, to the attenuator input voltage $E_{in}$, which appears across the terminals 16 and 15, the switch 10 is first thrown to its A position which applies the attenuator input voltage $E_{in}$ across the full unity scale of the potentiometer. The attenuator energizing source 12 is connected in opposition with the voltage $E_x$ of source 7 and the source 7 is adjusted until $E_x$ balances $E_{in}$ as determined by the galvanometer indicator. This standardizes the potentiometer to the input voltage $E_{in}$. The switch 10 is next thrown to position B which applies the attenuator output voltage $E_{out}$ between the zero end of the potentiometer and the movable contact arm 8 thereof. Arm 8 is moved along the slide wire until the galvanometer is balanced, the adjusted setting of the potentiometer as read on the calibrated scale thereof is the ratio of $E_{out}$ to $E_{in}$ directly. The attenuator may then be set to its next position and the arm 8 adjusted to balance the indicator to give the next ratio reading. The standardization of the potentiometer should be checked occasionally since $E_{in}$ or $E_x$ may drift. This is done simply by throwing switch 10 to its A position and readjusting $E_x$ to balance $E_{in}$.

In Fig. 2 a modified voltage ratio measuring potentiometer is shown with which a greater accuracy and range may be obtained. The maximum ratio of $E_{out}$ to $E_{in}$ obtainable with the device of Fig. 1 is 1.0 while with this embodiment it is possible to measure ratios up to 1.61. The resistance network of the potentiometer consists of two parts, a slide wire portion 30 having a movable contact arm 31 for making fine adjustments and a coarse adjustment portion 32 which comprises a 16 position rotary switch having 15 matched resistance elements 33 serially connected between the contacts thereof. With this arrangement the standardizing input voltage $E_{in}$ is connected across the 0 and 1.0 contacts of switch 32, the 0 connection being made to terminal 15 on the attenuator through switch 34 set to its "closed" position and lead 35, the 1.0 connection being made through lead 36, the contacts 24 and 18 of switch 10 and terminal 16 of the attenuator. The output voltage connections to the potentiometer are, in this embodiment, made to each of the movable contact arms 31 and 37 of the fine and coarse resistance networks 30 and 32, respectively. Attenuator terminal 17 is, as in Fig. 1, connected to contact 19 of switch 10 and contact 25 thereof is connected to the arm 37 of switch 32. The common attenuator terminal 15 is connected through switch 34 "open" position directly to arm 31 of slide wire 30.

To make voltage ratio measurements of $E_{out}$ to $E_{in}$ with the system of Fig. 2 the switch 10 is first thrown to its A position and switch 34 to its closed position and potential source 7 is adjusted to balance the galvanometer indicator. Switch 34 is then switched to "Open" to isolate the common terminal 15 of the attenuator from the zero position of switch 32 and the switch 10 is thrown to B position and the arms 31 and 37 adjusted for balance. Slide wire 30 has a resistance slightly greater than one of the resistance elements 33 of switch 32. In the device shown, the slide wire has a resistance of 1.1 times that of elements 33, the resistance of a unit 33 being 5 ohms and the total resistance of the slide wire 30 is 5.5 ohms. The range of this potentiometer voltage ratio measuring system is, therefore, continuous from 0 to 1.61 (1.5 of switch 32 plus 0.11 of slide wire 30). Since the total range of the slide wire is only 0.11 unit, it may be read to about one digit greater accuracy than the slide wire of the device of Fig. 1 which has a range of 1.0 unit. Greater ranges may be obtained simply by calibrating the input voltage over smaller subdivisions of the potentiometer resistance network.

The above described methods of measuring the decibel loss of an attenuator do not take into account the Zero Losses which, as mentioned above, may have a substantial effect on the accuracy of the attenuator calibration. Correction for these Zero Losses will be discussed below in connection with Fig. 3.

In Fig. 3 the potentiometer for making voltage ratio measurements is, for simplification of the description, shown to be similar to that of Fig. 1. In this circuit, a potentiometer 44 is connected between matched, fixed resistors 48, the series arrangement of which is bridged across the battery 43 and a series connected variable resistor 42 across which a potential difference of "$E_1$" volts is developed. A line matching resistor 45 having a resistance $R_{in}$ equal to the input impedance of the attenuator 11 is connected in series with the input to the attenuator 11 is connected in series with the input to the attenuator (between terminals 16 and 15 thereof). The output of the attenuator is terminated with a resistor 46 across terminals 17 and 15 having a resistance $R_{out}$ which is equal to the output impedance of the attenuator. Resistors 45 and 46 match the test circuit to the attenuator and thereby eliminate reflection losses.

The resistance of the internal cabling, including the resistance between the common terminals 15—15 is shown as two resistors 49 having resistances of $$\frac{\Delta R}{2}$$

each. In making voltage ratio measurements with the system of Fig. 3 the attenuator is first set to its zero decibel position, the resistor 42 in series with the battery 43 for the attenuator is adjusted for the desired voltage $E_{in}$ which should be the normal operating potential input for the attenuator. The potentiometer 5 in this case is standardized with the attenuator output voltage $E_{out}$. In standardizing the potentiometer 5, contact arm 8 is set to its 1.0 position, switch 10 set to its B position, switch 70 set to its B position, and the potentiometer source 7 adjusted for galvanometer zero. In order to obtain a reference voltage $E_s$ for checking the potentiometer standardization when the attenuator is set to its fixed loss positions, the switches 10 and 70 are thrown to position A and the potentiometer 44, which is bridged across the $E_1$ source for the attenuator, is adjusted for galvanometer zero. This adjustment sets the input calibration voltage $E_s$ for the potentiometer equal to the output voltage $E_{out}$ across resistor 46 when the attenuator is set for zero decibels loss. The adjustment of potentiometer 44 need only be made once for a given attenuator. Voltage ratio measurements with this system may then be made in accordance with the procedure outlined above, namely by throwing switch 10 to its B position and then balancing the potentiometer, the resulting reading being the voltage ratio of $E_{out}$ to $E_{in}$ including the correction for Zero Losses.

While Formula 1 is valid for computing attenuator insertion loss where the input and output impedances of the attenuator are equal, the above Zero Loss corrected method of making insertion loss measurements is also valid for units or networks having different input and output impedances as will be shown below.

The basic formula for computing insertion loss is:

$$db_{IL} = 20 \log \frac{I_1}{I_2} \qquad (2)$$

where "$db_{IL}$" is the insertion loss in decibels and "$I_1$" and "$I_2$" are the currents flowing in the output resistance (46 Fig. 3) before and after insertion of the attenuator network 55. The impedance of the internal cabling may, for practical purposes, be considered as fixed resistors 49 of $$\frac{\Delta R}{2}$$

ohms resistance each so that the current "$I_1$", with the attenuator set to its zero position, is:

$$I_1 = \frac{E_1}{R_{in} + R_{out} + \Delta R} \qquad (3)$$

The output current $I_2$ is:

$$I_2 = \frac{E_{out}}{R_{out}} \qquad (4)$$

By substituting "$I_1$" and "$I_2$" of Equations 3 and 4 in Equation 2 the actual insertion loss is:

$$db = 20 \log \frac{\frac{E_1}{R_{in}+R_{out}+\Delta R}}{\frac{E_{out}}{R_{out}}} \text{ or } 20 \log \frac{R_{out}}{R_{in}+R_{out}+\Delta R} \cdot \frac{E_1}{E_{out}} \qquad (5)$$

where $R_{in} = R_{out} = R$, the characteristic impedance of the attenuator, this reduces to:

$$db = 20 \log \frac{R}{2R + \Delta R} \cdot \frac{E_1}{E_{out}} \qquad (6)$$

Equations 5 and 6 then are equivalent to Equation 1 modified by the Zero Loss factor $$\frac{R_{out}}{R_{in}+R_{out}+\Delta R} \text{ and } \frac{R}{2R+\Delta R}$$

respectively.

Under the standardized condition for Fig. 3 as described above, the potentiometer 5 is standardized to $E_{out}$ which equals $$\frac{R}{2R+\Delta R}E_1$$

volts or $$\frac{R_{out}}{R_{in}+R_{out}+\Delta R}E_1$$

and $E_s$ is set to this same value. As mentioned above $E_s$ is a convenient reference voltage for checking the measuring potentiometer when the attenuator is set to its fixed loss positions.

The effects of drift in either potential source $E_1$ or $E_x$ is substantially eliminated by deriving both $E_x$ and $E_1$ from the same source so that drift in the common source varies both $E_x$ and $E_1$ by corresponding amounts. In the power supply circuit of Fig. 4 both $E_x$ and $E_1$ are derived from a common A.C. source 56 by circuits which present substantially identical loads to the source. These circuits include identical secondary windings 58 and 59 of transformer 57 and identical bridge type full wave rectifiers 60 and 61 respectively, the outputs of which are passed through filters 62 and 63 also of identical construction. The outputs of the filters 62 and 63 are made to see identical loads by the inclusion of a resistor 65 across the output of filter 63. Variable series resistances 64 and 67 are provided in the outputs of the $E_x$ and $E_1$ sources respectively for varying $E_x$ and $E_1$ as required. Voltages $E_x$ and $E_1$ of Fig. 4 may be applied to the measuring potentiometer terminals 53 and 54 and to terminals 51 and 52 of the attenuator input circuit in place of source 7 and battery 43 and resistor 42 respectively.

While the invention has been described for purposes of illustration with reference to measuring the output to input voltage ratios of attenuators it also will be apparent that the general principles of the invention are applicable to measuring the ratio of any two voltages. It is to be understood, therefore, that the above detailed description is merely illustrative of the invention and that others embodying the principles of the invention and falling within the scope thereof may be devised by those skilled in the art.

What is claimed is:

1. The method of measuring, with a potentiometer having a calibrated series impedance shunted by a variable potential source, the Zero Loss corrected ratio of the output to the input voltages of an adjustable attenuator for determining the insertion loss of the fixed loss positions of the attenuator, corrected for Zero Loss, said attenuator being connected in a circuit having matching input and output impedances therefor, the method comprising setting the attenuator to its no loss position, applying a potential difference across the input to the attenuator, applying the attenuator output voltage across a calibrated unit of the potentiometer, adjusting the potentiometer source to produce a potential difference across the unit equal to the output voltage, setting the attenuator to each of its fixed loss positions and matching the attenuator output voltage with a potential difference existing across a portion of the calibrated potentiometer whereby the number of units on the calibrated impedance required to develop the matching potential difference is equal to the ratio of the attenuator output voltage to its input voltage corrected for Zero Loss.

2. A method according to claim 1 which includes deriving the variable potential for the potentiometer and the attenuator input potential from a common potential source to nullify the effects of drift in either the potentiometer potential or the attenuator input potential with respect to the other.

3. An insertion loss measuring system for calibrating an adjustable attenuator comprising an input circuit for the attenuator including a source of potential and an input impedance, for matching the attenuator input impedance, connected in series with the source of potential and the input to the attenuator, an adjusting potentiometer connected in parallel with the source, an attenuator output impedance matching element connected across the attenuator output, a ratio measuring potentiometer having a calibrated series impedance with an adjustable voltage tap thereon, shunted with a variable source of potential and switching means for selectively applying a potential difference, from the adjustable potentiometer connected in parallel with the source for the attenuator, across a unity division of the calibrated potentiometer and for applying the attenuator output potential to the adjustable tap of the ratio measuring potentiometer.

4. A system according to calim 3 in which the sources of potential for the attenuator and the measuring potentiometer are derived from substantially identical rectifiers energized by a common A.C. source.

5. A system according to claim 3 in which the sources of potential for the attenuator and the measuring potentiometer are derived from substantially identical rectifiers energized by a common A.C. source, and a shunting impedance element is included in the output of at least one of the rectifiers for balancing the loads of the two rectifier circuits to substantially eliminate the effects of variations in the common A.C. source.

6. In the calibration of an attenuator, having a no loss condition and at least one other condition of fixed attenuation, with a potentiometer having a calibrated series impedance shunted by a variable potential source, the method of measuring the ratio of the output potential of the attenuator with its fixed attenuation to the output potential of the attenuator with Zero Loss attenuation for determining the Zero Loss corrected insertion loss of the attenuator connected in a circuit having matched input and output impedances therefor, said method comprising standardizing the potentiometer by setting the attenuator to its no loss condition, applying the attenuator output potential across a calibrated unit of the potentiometer and adjusting the potentiometer source to produce a potential difference across the unit equal to said applied potential, setting the attenuator to its condition of fixed attenuation, and balancing the resulting output potential across the calibrated impedance whereby the number of units of the impedance required to develop the balancing potential is equal to the desired ratio.

7. In the calibration of an attenuator, having a no loss condition and at least one other condition of fixed attenuation, with a potentiometer having a calibrated series impedance shunted by a variable potential source, the attenuator having an input impedance of "$R_{in}$" ohms, an output impedance of "$R_{out}$" ohms and an internal cabling resistance of "$\Delta R$" ohms and being connected in a circuit having matching input and output impedances therefor, the method of measuring the ratio of the output potential of the attenuator with its fixed attenuation to the output potential of the attenuator with Zero Loss attenuation for determining the Zero Loss corrected insertion loss of the attenuator, said method comprising standardizing the potentiometer by applying, to a calibrated unit of the series impedance, a potential difference of a magnitude equal to the quantity $$\frac{R_{out}}{R_{in}+R_{out}+\Delta R}$$

times the potential difference applied across the attenuator input and its input matching impedance, and adjusting the variable potential source of the potentiometer to produce a potential difference across the calibrated unit equal to said applied potential difference, setting the attenuator to its condition of fixed attenuation, and balancing the resulting output potential across the calibrated impedance whereby the number of units of the impedance required to develop the balancing potential is equal to the desired ratio.

8. In the calibration of an attenuator, having a no loss condition and at least one other condition of fixed attenuation, with a potentiometer having a calibrated series impedance shunted by a variable potential source, the attenuator having equal input and output impedances of "$R$" ohms, and an internal cabling resistance of "$\Delta R$" ohms and being connected in a circuit having matching input and output impedances therefor, the method of measuring the ratio of the output potential of the attenuator with its fixed attenuation to the output potential of the attenuator with Zero Loss attenuation for determining the Zero Loss corrected insertion loss of the attenuator, said method comprising standardizing the potentiometer by applying, to a calibrated unit of the series impedance, a potential difference of a magnitude equal to the quantity $$\frac{R}{2R+\Delta R}$$

times the potential difference applied across the attenuator input and its input matching impedance, and adjusting the variable potential source of the potentiometer to produce a potential difference across the calibrated unit equal to said applied potential difference, setting the attenuator to its condition of fixed attenuation, and balancing the resulting output potential across the calibrated impedance whereby the number of units of the impedance required to develop the balancing potential is equal to the desired ratio.

References Cited in the file of this patent

UNITED STATES PATENTS

| 819,355 | Leeds et al. | May 1, 1906 |
| 2,363,372 | White | Nov. 21, 1944 |
| 2,434,544 | Boykin | Jan. 13, 1948 |
| 2,780,776 | Goeppinger et al. | Feb. 5, 1957 |

FOREIGN PATENTS

| 593,920 | Great Britain | Oct. 29, 1947 |

OTHER REFERENCES

Article by Howard C. Roberts published in Instruments, vol. 18, July 1945, pages 462–465. (Only page 462 relied upon.) (Copies available in Scientific Library and 324–63.)